Sept. 27, 1960 S. B. PFEIFFER 2,954,501

JITTER SUPPRESSION IN HIGH-FREQUENCY STROBOSCOPIC OSCILLOSCOPE

Filed Oct. 14, 1959 3 Sheets-Sheet 1

INVENTOR
S. B. PFEIFFER
BY Patrick J. Roche
ATTORNEY

Sept. 27, 1960

S. B. PFEIFFER 2,954,501

JITTER SUPPRESSION IN HIGH-FREQUENCY
STROBOSCOPIC OSCILLOSCOPE

Filed Oct. 14, 1959

3 Sheets-Sheet 2

INVENTOR
S. B. PFEIFFER
BY
Patrick J. Roche
ATTORNEY

Sept. 27, 1960 S. B. PFEIFFER 2,954,501
JITTER SUPPRESSION IN HIGH-FREQUENCY
STROBOSCOPIC OSCILLOSCOPE
Filed Oct. 14, 1959 3 Sheets-Sheet 3

INVENTOR
S. B. PFEIFFER
BY
Patrick J. Roche
ATTORNEY

United States Patent Office 2,954,501
Patented Sept. 27, 1960

2,954,501

JITTER SUPPRESSION IN HIGH-FREQUENCY STROBOSCOPIC OSCILLOSCOPE

Sigmund B. Pfeiffer, New Providence, N.J., assignor to Bell Telephone Laboratories, Incorporated, New York, N.Y., a corporation of New York Filed Oct. 14, 1959, Ser. No. 846,428
9 Claims. (Cl. 315—22)

This invention relates to apparatus for displaying signal patterns on a stroboscopic oscilloscope, and more specifically to an arrangement for suppressing jitter in the display on an oscilloscope screen of signals having a duration in the order of millimicroseconds.

Apparatus for displaying millimicrosecond pulses on a cathode ray tube screen is presently known. One type of such apparatus is a stroboscopic oscilloscope which includes, among other components, a staircase generator and coincidence circuit; either or both of which are possible sources of jitter and thereby tend to introduce error into the oscilloscope traces. In addition this apparatus tends toward complexity of operation due to the large number of circuits and components required. Another known apparatus is a traveling wave oscilloscope having a cathode ray tube equipped with travelling wave helices instead of the conventional vertical deflection plates. This apparatus has the main disadvantage of low deflection sensitivity and the cathode ray tube is expensive to produce.

The present invention contemplates a stroboscopic oscilloscope for expeditiously suppressing the effects of jitter tending to occur in the repetition rates of signaling and/or sampling voltages.

The main object of the invention is to improve the quality of a low-frequency display on the screen of a stroboscopic oscilloscope as representative of a high-frequency signal voltage.

Another object is to suppress the effect of jitter occurring in a high-frequency signal when it is displayed on a stroboscopic oscilloscope.

An additional object is to suppress the effect of jitter in the display of high-frequency signals on a stroboscopic oscilloscope without materially imparing the information contained in the signal.

A further object is to suppress in a stroboscopic oscilloscope display the effects of jitter arising in the frequency rates of the signaling and sampling voltages.

Still another object is to suppress substantially entirely the effect of jitter originating in a high-frequency sampling rate in a stroboscopic oscilloscope.

A still further object is to suppress in a stroboscopic oscilloscope the effects of jitter occuring in a high-frequency signal to an amount which is approximately equivalent to the amount present in an oscilloscope not employing the stroboscopic principle.

A still further object is to display Lissajous patterns in a stroboscopic oscilloscope.

In association with a cathode ray oscilloscope including vertically and horizontally deflecting plates, a screen, and a brightness electrode, a source of high-frequency signal voltage whose representation is to be displayed on the oscilloscope screen, a generator of sawtooth and pulse voltages triggered by the signal voltage, a producer of sampling pulses, a first normally inoperative gating circuit, circuit means connecting the signal source via the first gating circuit to the vertically deflecting plates and also connecting the sawtooth and pulse voltage generator to the horizontally deflecting plates and brightness electrode, and other circuit means connecting the sampling pulse producer to the first gating circuit which is activated by the sampling pulses whereby a low-frequency replica voltage of the signal voltage is supplied to the vertically deflecting plates, the present invention comprises normally inoperative second and third gating circuits of which the first-mentioned circuit means connects the second gating circuit intermediate the sawtooth voltage generator and horizontally deflecting plates, the first-mentioned circuit means also connects the third gating circuit intermediate the pulse generator and the brightness electrode, the other circuit means also connects the sampling pulse producer to the second and third gating circuits which are activated by the sampling pulses whereby low-frequency replica voltages of the sawtooth and brightness pulse voltages are supplied to the vertically deflecting plates and brightness electrode, respectively. Thus, the low-frequency replica signal voltage is swept across the oscilloscope screen by the low-frequency replica sawtooth voltage in such manner that the effects of jitter occurring in the frequency rates of the signaling and/or sampling voltages are substantially suppressed. In the signal sweep, the low-frequency replica pulse voltage serves to blank the flyback portions of the low-frequency replica sawtooth voltage from the low-frequency replica signal voltage waveform trace produced on the oscilloscope screen.

A low-pass filter connected in circuit with the output of each of the first, second and third gating circuits is provided with a cutoff frequency which is one-half the numerical value of the frequency of the sampling pulses supplied by the sampling producer. These filters serve to attenuate the high-frequency components associated with the respective low-frequency replica voltages applied to the several electrodes of the oscilloscope. A suitable amplifier may be connected in the output of each of the filters, if amplification of the respective low-frequency replica voltages is desired.

In a modification of the invention, the sawtooth and pulse generator may be replaced by two additional but independent sources of high-frequency signals whereby signals from the first-mentioned source and signals from one of the two additional signal sources may be supplied simultaneously to the vertically and horizontally deflecting plates, respectively, for producing Lissajous patterns on the oscilloscope screen, while the signals from the other of the two additional sources may be supplied to the brightness electrode for modulating the brightness of the Lissajous patterns.

A feature of the invention involves the triggering of the sawtooth voltage generator from the signal source and then simultaneously sampling the signal and sawtooth voltages via separate gating circuits triggered from a common sampling-pulse producer. This supplies low-frequency replica voltages of the high-frequency signal and sawtooth voltages simultaneously to the vertically and horizontally deflecting plates, respectively, of the oscilloscope. Such low-frequency replica voltages have amplitudes and phase which are substantially identical with the amplitudes and phase of their high-frequency prototypes.

Another feature resides in the suppression but not the complete elimination of the effects of jitter in the signal voltage so that substantially full signal information is displayed in the trace produced on the oscilloscope screen for observation and study. Thus, the effect of jitter left in the signal is substantially the same as that for an oscilloscope not employing the stroboscopic principle.

A further feature concerns the substantially complete suppression of the effects of jitter in the sampling pulse rate.

A still further feature concerns the application of two independent signals through two different gating circuits to the vertically and horizontally deflecting plates of an oscilloscope for producing Lissajous patterns on the screen thereof.

An additional feature involves the use of a commercially available oscilloscope to display the patterns of millimicrosecond signals on a stroboscopic oscilloscope, without materially affecting the signal information.

Another additional feature concerns the use of the wide bandwidth and high-deflection sensitivity of a stroboscopic oscilloscope for displaying high-frequency repetitive signals thereon.

The invention will be readily understood from the following description when taken together with the accompanying drawing in which.

Figure 1:
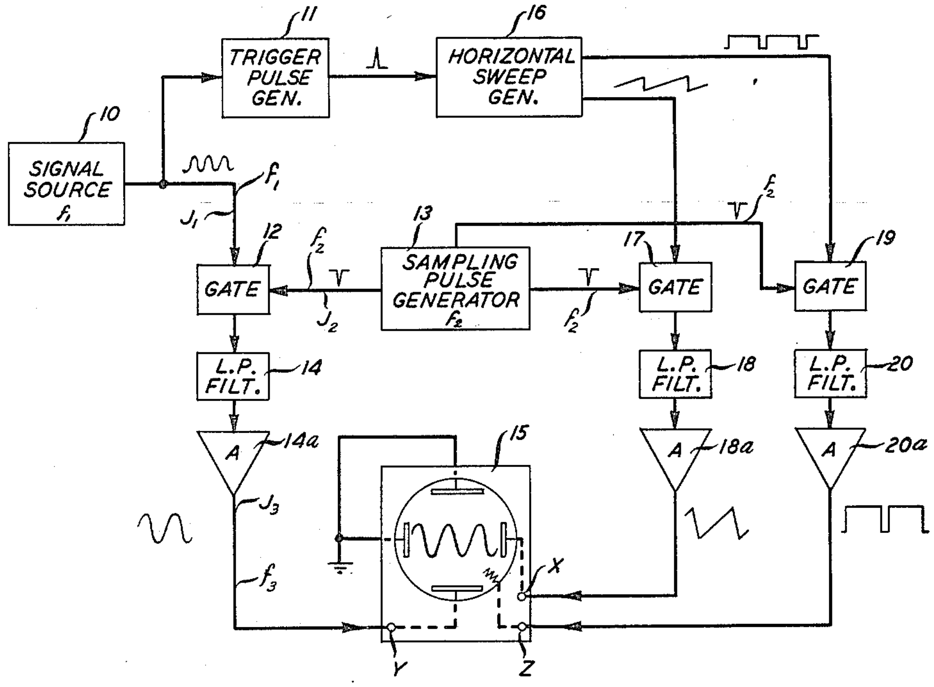
Fig. 1 is a box diagram illustrating a specific embodiment of the invention.
Figure 4:
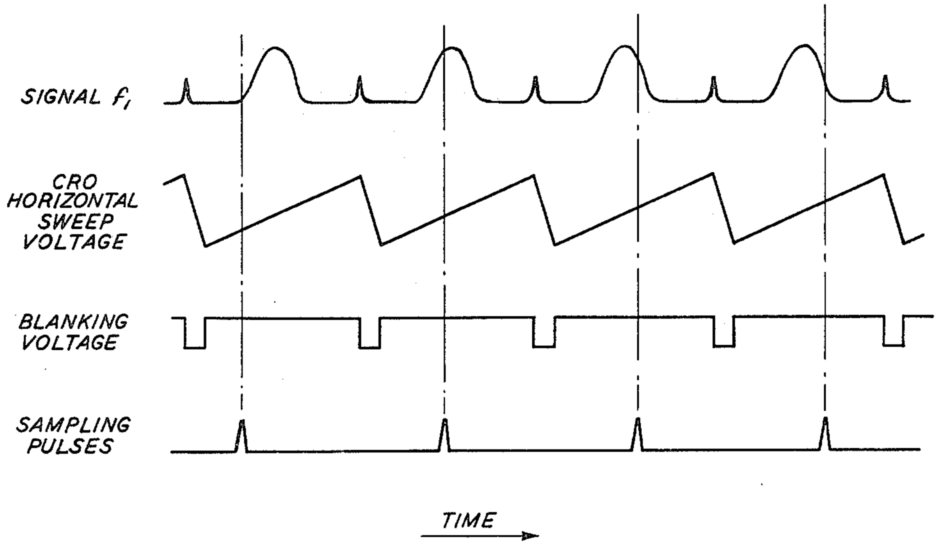
Figure 5:
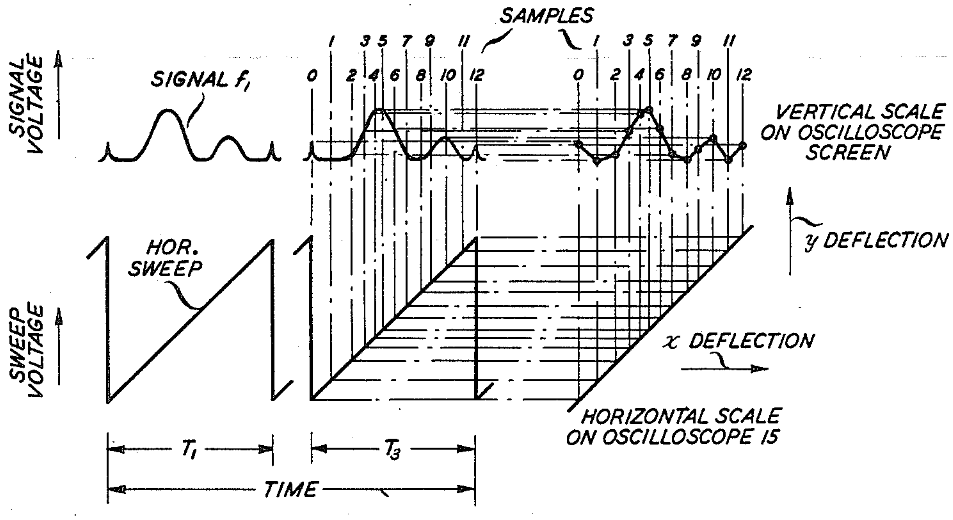
Figure 6:
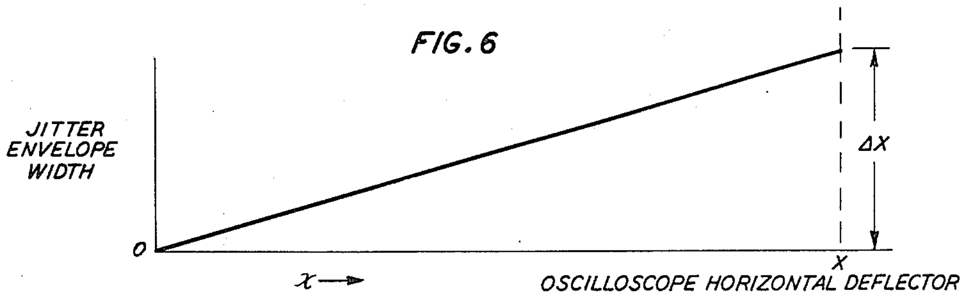
Figure 7:
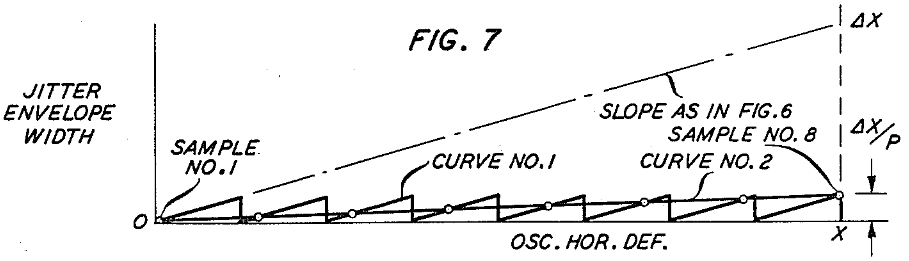

Figs. 3A, 3B, 3C and 3D constitute a group of waveforms illustrating the effects of jitter in a particular type of signal;

Fig. 4 is a family of curves showing the simultaneous sampling of the signal, sawtooth and brightness voltages;

Fig. 5 is a group of curves illustrating a plurality of samples taken from a signal at a plurality of successively different time intervals and applied to Y and X coordinates of an oscilloscope for establishing an oscilloscope pattern;

Fig. 6 is a waveform showing jitter envelope width plotted on an oscilloscope screen for one period of a low-frequency replica of a signal voltage; and Fig. 7 is a group of waveforms illustrating action obtainable in Fig. 1 to suppress the effects of jitter in a signal voltage.

Referring to Fig. 1, a source 10 of high-frequency signal voltage has one portion of its output connected to a trigger pulse generator 11 and a second portion of its output to one input of a gating circuit 12. For the purpose of this explanation, the signal at the second output may comprise a sine wave having a frequency $f_1$ lying in the 20 through 40-megacycle range. In this connection, it will be understood that the signal may also include a waveform constituting a word or the like and having a preselected high-frequency repetition rate $f_1$ for display on an oscilloscope screen in a manner that will be subsequently mentioned. In another aspect, the signal comprehends millimicrosecond pulses whose waveform also may be observed on the oscilloscope screen.

A generator 13 of sampling pulses $f_2$ is connected to a second input of the gating circuit whose type and operation are well known in the art. Thus, it will be understood that the gate circuit is normally blocked but activated to a conductive condition only when individual sampling pulses are supplied thereto. As a consequence, successively discrete portions of the signal voltage in a time sequence are passed through the gating circuit only when the latter is in the conductive condition. The frequency $f_2$ of the sampling pulses may be preselected at a suitable value which, for the purpose of the present description, may lie between 5 and 10 megacycles. The time duration of each signal sample must be made very much shorter than the repetitive period of the signal to obtain high resolution. It is accordingly apparent that the frequency of the sampling pulses $f_2$ may be continuously adjusted as desired in the well-known manner in relation to the frequency of the signal $f_1$ to provide the optimum trace of the signal on the oscilloscope screen. The output of the gating circuit is supplied through low-pass filter 14 and amplifier 14*a* to the Y-terminal or vertically deflecting plates of a cathode ray oscilloscope 15 whose structure and operation are well known in the art. It will be understood the oscilloscope includes a bandwith which is available in commercially available CRO circuits.

Figure 2:
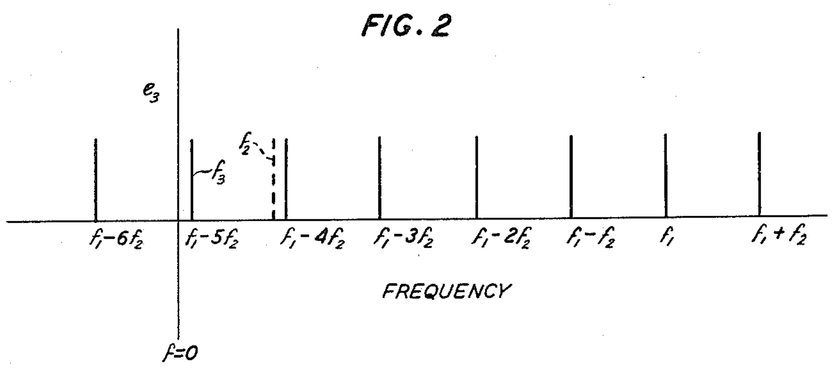
Fig. 2 is a family of curves illustrating action obtainable in Fig. 1.

Assuming for the moment the signal is a sine wave of frequency $f_1$ and the sampling rate is at the frequency $f_2$, the gating circuit may be considered to function as a modulator producing an output frequency spectrum, a part of which is illustrated in Fig. 2. If the numerical value of the sampling frequency $f_2$ is adjusted so that such value or one of the harmonics of the latter frequency $f_2$ is very nearly equal to the numerical value of signal frequency $f_1$, the gating circuit output voltage $e_3$ will contain a low-frequency component whose numerical value is equal to the numerical frequency $|f_1-nf_2|$, where $n$ represents the order of the nearest harmonic. In Fig. 2, such lowest output frequency would be represented by the term $(f_1-5f_2)$ which is produced when the signal $f_1$ beats with the fifth harmonic of the sampling rate $f_2$. Hence, the low-pass filter having a cutoff frequency less than one-half $f_2$ is connected in circuit between the output of the gating circuit and Y-terminal of the oscilloscope to attenuate the higher frequency components so that only the low-frequency component is supplied to the last-mentioned terminal.

Such low-frequency component may be defined as component $f_3$ which bears the following relationship to the signal and sampling pulse frequencies, $f_1$ and $f_2$, respectively:

$$f_3=|f_1-nf_2| \qquad (1)$$

where $f_1$ is the signal fundamental frequency, $f_2$ the sampling rate, and $n$ the order of $f_2$ harmonic whose numerical value is nearest to that of the signal frequency $f_1$.

Assuming now the signal is a complex wave having a period $$\frac{1}{f_1}$$

then the frequency spectrum of such signal may be written $f_1+2f_1+3f_1+\ldots+mf_1+\ldots$ It can be shown that the $m$-th harmonic of the signal frequency $f_1$ will beat with the $mn$-th harmonic of the sampling rate $f_2$ to produce the $m$-th harmonic of the component $f_3$. Hence, the following equations can be written:

$$f_3=|f_1-nf_2|$$

for the signal fundamental frequency $f_1$ as shown in Equation 1; and $$mf_3=|mf_1-mnf_2| \qquad (2)$$

for the $m$-th harmonic of the signal fundamental frequency $f_1$. Equation 2 is true for the condition when the numerical value of the component $mf_3$ is less than one-half the numerical value of the sampling rate $f_2$. From the foregoing, it is apparent that each signal harmonic produces a corresponding low-frequency harmonic in the gating-circuit output. In this connection, it can be shown that the last-mentioned low-frequency harmonic retains an amplitude and phase that are substantially identical with the amplitude and phase of the high-frequency signal. As a consequence, the low-frequency component $f_3$ in the gating-circuit output is approximately a low-frequency replica voltage of the signal voltage $f_1$ in regard to both amplitude and phase.

The frequency-conversion factor of gating circuit 12 including low pass filter 14 in its output may be defined as the ratio of the signal input frequency $f_1$ to the output frequency $f_3$ and may be expressed as follows:

$$P=\frac{f_1}{f_3}=\frac{f_1}{|f_1-nf_2|} \qquad (3)$$

Thus, the frequency conversion factor is a function of frequencies $f_1$ and $f_2$ and can be made very large by making the term $nf_2 \approx f_1$.

A repetitive signal is a time function which satisfies the condition:

$$e(t)=e(t+T)=e(t+mT) \quad (4)$$

where T is a constant and $m$ is any integer. The frequency spectrum of such a signal can contain only $$\frac{1}{T}$$

as a fundamental, its harmonics, and a direct-current term. This signal produces a sharply defined trace on an oscilloscope screen.

Figure 3A:
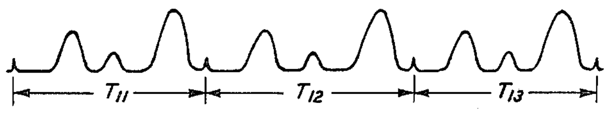

A quasi-repetitive signal has a waveform which repeats itself but the time interval between repetitions varies by a slight amount, as illustrated in Fig. 3A. Thus, the successive time intervals $T_{11}$, $T_{12}$ and $T_{13}$ may be expressed as follows:

$$T_{11}\neq T_{12}\neq T_{13} \quad (5)$$

The inequalities of the successive time intervals constitute jitter in the signal.

Figure 3B:
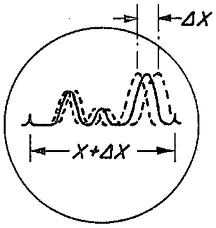
Figure 3C:
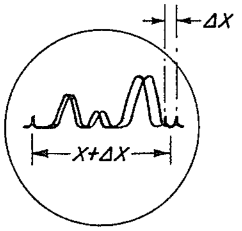
Figure 3D:
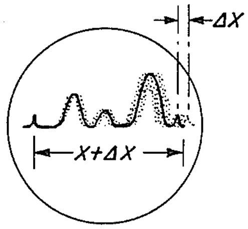

When the wavefrom of a quasi-repetitive signal is viewed on an oscilloscope screen, a multiple or smeared trace will usually result, being most severe in the proximity of the termination of the trace. This may be readily observed by referring to Fig. 3 through 3D in which: Fig. 3B shows a moving or jumpy trace when the frequency of the signal period variation in Fig. 3A is very low; Fig. 3C shows a multiple trace when the frequency of the signal period variation in Fig. 3A is higher than that involved in Fig. 3B; and Fig. 3D shows a smeared trace when the frequency of the signal period variation in Fig. 3A is still higher than involved in Fig. 3C.

Examination of the traces in Figs. 3B, C and D indicates that the respective traces stay within an envelope which increases in width as the trace proceeds toward the right. This envelope has a maximum width ΔX. Jitter J may then be defined as envelope width, ΔX, divided by the horizontal length $X+\Delta X$ and expressed $$J=\frac{\Delta X}{X+\Delta X} \quad (6)$$

of one signal cycle shown on the oscilloscope screen as illustrated in Figs. 3B, C and D. Thus, jitter J is a measure of the maximum normalized horizontal fluctuation of an oscilloscope trace.

Since the horizontal sweep of the oscilloscope trace proceeds at a constant rate across the screen, jitter J for the signal can be expressed $$J=\frac{\Delta T}{T+\Delta T} \quad (7)$$

where T is the average period of the signal and ΔT represents the peak-to-peak variation of the signal period.

Jitter in the output of gating circuit 12 may originate from jitter in the input signal $f_1$ or in the sampling rate $f_2$ or in both in the circuit shown in Fig. 1. Thus, in Fig. 1, the relationship between jitter in the output of the gating circuit 12 and jitter in the signal $f_1$ or in the sampling rate $f_2$ may be derived in the following manner.

The period U of a signal with jitter may be expressed $$U=T+\Delta T \quad (8)$$

where T is the average period of the signal and ΔT is the maximum deviation or peak-to-peak variation of the signal period.

As indicated above in Equation 1, the frequency relationship for sampling gate 12 may be expressed $$f_3=|f_1-nf_2|$$

Since $$f=\frac{1}{T}$$

the following relationship may be written $$\frac{1}{T_3}=\frac{1}{T_1}-\frac{n}{T_2} \quad (9)$$

where $T_1$ and $T_2$ are the average periods of signal $T_1$ and sampling pulse $T_2$, respectively.

In the presence of jitter, Equation 9 becomes $$\frac{1}{T_3+\Delta T_3}=\frac{1}{T_1+\Delta T_1}-\frac{n}{T_2+\Delta T_2} \quad (10)$$

where $T_3$ is the average period of the gating circuit output, and $\Delta T_1$, $\Delta T_2$ and $\Delta T_3$ are the peak-to-peak variations of the signal $f_1$, sampling rate $f_2$, and output of gating circuit 12, respectively, in Fig. 1.

Subtracting terms of Equation 10 from Equation 9, then $$\frac{\Delta T_3}{T_3+\Delta T_3}\times\frac{1}{T_3}=\frac{\Delta T_1}{T_1-\Delta T_1}\times\frac{1}{T_1}-\frac{\Delta T_2}{T_2+\Delta T_2}\times\frac{n}{T_2} \quad (11)$$

Since $$J=\frac{\Delta T}{T+\Delta T}$$

in Equation 7, then $$J_3=J_1\frac{T_3}{T_1}-J_2\frac{nT_3}{T_2} \quad (12)$$

where $J_3$ is the jitter in the output of gating circuit 12 in Fig. 1.

By making suitable substitutions, Equation 12 can be expressed in terms of the frequency conversion factor P, which was described previously.

Therefore, $J_3=PJ_1-(P-1)J_2$ (for jitter in both the signal and sampling rate) (13)

$J_3=PJ_1$ (jitter in signal only) (14)

$J_3=(P-1)J_2$ (jitter in sampling rate only) (15)

$J_1$=signal jitter $J_2$=sample-rate jitter $J_3$=jitter in output of gating circuit 12 in Fig. 1 or in low-frequency replica voltage of the high-frequency signal.

In the foregoing equations, it would appear that a small signal jitter $J_1$ which may not be discernible in the trace of a signal $f_1$ applied to a conventional oscilloscope, may be greatly magnified in the gating circuit output of a stroboscopic oscilloscope. Such an oscilloscope may thereby be rendered useless for observing the waveform of such a signal. When observing the waveforms of high-frequency signals on an oscilloscope screen, the frequency conversion or reduction factor P may have to be as high as 1,000 so that the low-frequency replica voltage of the signal is within the bandwidth limitations of conventional oscilloscopes.

It may seem strange that jitter in the output of the gating circuit 12 and low-pass filter 14 in Fig. 1 is greater than in the signal $f_1$ because the latter output is a low-frequency replica voltage of signal $f_1$. This, it can be shown, is true only if the frequency spectrum of the signal consists solely of frequencies equal to $$\frac{f_1}{n}$$

and its harmonics. Jitter in signal $f_1$ means that sideband frequencies are also present in the signal frequency spectrum and these sideband frequencies will not likely equal $$\frac{f_1}{n}$$

or any of its harmonics. The value of conversion factor P will then be different for such sidebands, with the result that frequency proportionality between the fundamental $f_1$ and sidebands will be destroyed in the sampling process. Jitter in the output of gating circuit 12 and filter 14 will then be different because it is caused by these sidebands. As a consequence, the output of gating circuit 12 and filter 14 will not be an exact replica of the signal $f_1$ if jitter is present in the signal $f_1$.

A small amount of jitter in the sampling rate $f_2$ may also produce a serious problem, if the frequency conversion or reduction factor P is large so that the low-frequency replica voltage of the high-frequency signal $f_1$ is held within the bandwidth limitations of the oscilloscope. In the latter situation, the sampling rate $f_2$ must be extremely stable thereby placing severe restrictions on the design of the sampling pulse generator.

In accordance with the present invention, the aforenoted effects of jitter occurring in the frequency of signal $f_1$ and/or in the frequency of sampling rate $f_2$ and reflected in the low-frequency replica voltage of the signal applied to the Y-terminal of the oscilloscope as aforementioned in connection with Fig. 1 are substantially suppressed in the aspects discussed below. Referring again to Fig. 1, it will be understood that signal source 10 activates a pulse generator 11 of well-known structure which triggers a sweep generator 16. Thus, in response to each trigger pulse, generator 16 produces a sawtooth voltage which is supplied through gating circuit 17, low-pass filter 18 and amplifier 18*a* to the X-terminal or horizontally deflecting plates of the oscilloscope. In this connection, it will be understood that the commencement of signal $f_1$ and the sawtooth voltage occurs substantially simultaneously so that a complete trace of signal $f_1$ may be established on the oscilloscope screen. The same sampling pulse $f_2$ is also supplied to control gating circuit 17.

Horizontal sweep generator 16 also produces a square-wave pulse voltage during the flyback time of each sawtooth voltage. The generator for producing both sawtooth and square-wave voltages is well known in the art. The square-wave pulse is supplied through gating circuit 19, low-pass filter 20 and amplifier 20*a* to the Z-terminal or brightness electrode of the oscilloscope, and has a negative polarity as shown in Fig. 1 for blanking the flyback portion of the sawtooth voltage in the manner well understood in the art. It will be understood that gating circuits 17 and 19 are essentially identical with gating circuit 12, and are normally blocked or non-conductive but rendered conductive only when the sampling pulses are supplied thereto. As a consequence, successively discrete portions of the sawtooth and pulse voltages are passed through the gating circuits 17 and 19, respectively, only when the latter circuits are activated to the conductive condition by the sampling pulses of generator 13.

Also, as in the case of filter 14, the filters 18 and 20 are provided with cutoff frequencies which are less than one-half the numerical frequency of the sampling rate $f_2$. This ensures the attenuation of the high-frequency sideband components from the outputs of the respective filters 18 and 20 so that only low-frequency replica voltages of the sawtooth and blanking pulse voltages are supplied thereby to the X and Z oscilloscope terminals, respectively. Simultaneous sampling of the signal voltage $f_1$, the sawtooth voltage and the blanking voltage by successive sampling pulses $f_2$ is illustrated in the curves included in Fig. 4.

Now, let it be assumed that the signal $f_1$ and the horizontal sawtooth sweep voltage synchronized with it are both free from jitter, but jitter is present in the sampling rate $f_2$. This means that the successive sampling pulses are not equally spaced in time sequence. Fig. 5 illustrates, for example, how an oscilloscope trace is produced from twelve simultaneous sample pairs of the signal and sawtooth voltage, each sampling pair being taken at an irregular time interval relative to other sampling pairs. Obviously, each of the samples will be taken from an individual signal cycle, but since the signal and sweep voltages are repetitive, they need only to be drawn once as shown in Fig. 5. Referring to the latter figure, each pair of samples taken from the filter outputs in the respective signal and sawtooth branches of Fig. 1 is applied to the Y and X terminals, respectively, of oscilloscope 15. Each sample pair will then determine a corresponding location on the oscilloscope screen as shown by the reconstructed signal at the extreme right in Fig. 5. In Fig. 5, it will be understood that the 45-degree line on the right represents merely a conversion of a vertical deflection to a horizontal deflection, and this conversion could be shown equally as well at angles other than 45 degrees. Thus, it can be readily seen in Fig. 5 that the locus of points, as the samples progress in time, is dependent only on the signal and horizontal sawtooth sweep voltage and is therefore independent of jitter in the sampling rate $f_2$. The latter jitter, it has been found, will modulate only the speed at which the successive light spots sweep out the trace on the oscilloscope screen.

Let it be assumed now that the sampling rate $f_2$ is such that the nearest harmonic just exceeds the repetition rate of the signal $f_1$, that is, the term $(f_1 - nf_2)$ in Equation 1 is negative. If only the signal $f_1$ were sampled, the low-frequency replica voltage thereof in the output of filter 14 in Fig. 1 would retrogress in time, and a reversed trace of the signal waveform would appear on the oscilloscope screen. If, however, the horizontal sawtooth sweep voltage synchronized with the signal $f_1$ is sampled simultaneously therewith, the output of the gating circuit 17 and filter 18 would have a negative slope and thereby cause the oscilloscope trace to sweep in the reverse direction. However, the waveform traced on the oscilloscope screen will not be reversed, as $nf_2 > f_1$, because both the voltages activating the vertically and horizontally deflecting plates of the oscilloscope will be reversed in time sequence. In effect, the light spot on the oscilloscope screen will sweep out the same trace but in the opposite direction. As a consequence, in the simultaneous sampling of the vertically and horizontally activating voltages, the oscilloscope trace is independent of whether $f_1 < nf_2$ or $f_1 > nf_2$ so long as component $f_3$ and the highest harmonic thereof which is to be observed are less than one-half the numerical value of the sampling frequency $f_2$ and are within the pass-band of the oscilloscope. The repetition rate at which the luminous spot sweeps out the trace on the oscilloscope screen is equal to the frequency of low-frequency replica voltage $f_3$.

When the waveform of a signal $f_1$ having jitter is viewed as a trace on an oscilloscope screen, it will be noticed that the width of the jitter envelope ΔX is zero at the beginning of each horizontal sweep due to the synchronizing action of the horizontal sweep trigger pulses with the signal; but the jitter envelope ΔX increases in width as the sweep progresses across the oscilloscope screen and has a maximum width at the termination of the sweep, as illustrated in Figs. 3B, C and D. In Fig. 6, there is shown the jitter envelope width plotted against horizontal deflection for one period of the low-frequency replica voltage $f_3$ of signal $f_1$, ΔX representing the maximum width of the jitter envelope in the display on the oscilloscope screen. This jitter may be expressed:

$$J_{02} = \frac{\Delta X}{X + \Delta X} = PJ_1$$

where $J_{02}$ is the jitter in the oscilloscope trace, X the distance of the horizontal sweep, ΔX the maximum width of the jitter envelope, P the frequency conversion factor of the signal, and $J_1$ the jitter in the signal. $J_{02}$=jitter seen on display of a standard oscilloscope connected only to output of low-pass filter 14. As a consequence $J_{02} = J_3$.

When simultaneous sampling of the signal and horizontal sweep voltages is employed as hereinbefore discussed in regard to Fig. 1, the horizontal sweep generator 16 triggered by signal source 10 produces initially a high-frequency sweep voltage. The latter voltage is then sampled by the operation of pulse generator 13, gating circuit 17 and low-pass filter 18 to effect a low-frequency replica voltage of the high-frequency sweep voltage in respect to both amplitude and phase as mentioned hereinbefore. It is such low-frequency replica voltage which activates the horizontal sweep of the oscilloscope. The horizontal sweep is now synchronized P times with the signal instead of once for each repetition of the last-mentioned low-frequency replica voltage. This means that the jitter envelope cannot exceed $$\frac{\Delta X}{P}$$

as shown by sawtooth curve No. 1 in Fig. 7, while the actual width of the jitter envelope as seen on the oscilloscope trace follows curve No. 2 in Fig. 7, the latter envelope having a maximum width equal to $$\frac{\Delta X}{P}$$

where P is the number of samples of the high-frequency sawtooth sweep voltage. Therefore, the jitter in the signal display on the oscilloscope screen is substantially the same as that encountered in an oscilloscope driven directly by high-frequency signal and sweep voltages thereby preserving substantially the entire signal information. Hence, the maximum jitter envelope width of the signal trace may be expressed:

$$J_{03}=\frac{\frac{\Delta X}{P}}{X+\Delta X}=\frac{J_{02}}{P}=J_1$$

where P was made equal to 8 for the example shown in Fig. 7 and assumed for the purpose of the present explanation $$\frac{\Delta X}{P}$$

the maximum width of the envelope, X the distance of the horizontal sweep.

From the foregoing, it is seen that the simultaneous sampling of a signal and a sawtooth sweep voltage triggered by the signal source tends to minimize the jitter problems encountered in a stroboscopic oscilloscope of a known type which was heretofore used to sample only the signal voltage. The simultaneous sampling gating circuits for the signal and sawtooth sweep voltages, as well as that for the sampling of the blanking voltage, permit the use of a commercially available cathode ray oscilloscope having a moderate bandwidth. Since both the vertically and horizontally deflecting voltages, i.e., the signal and sawtooth voltages, respectively, are reduced in frequency by a factor P (which can be made very large) via the sampling gating circuits, the correspondingly resulting low-frequency replica voltages are easily amplified to produce high-deflection sensitivity in commercially available cathode ray oscilloscopes.

It is further seen in the foregoing that since the sampling rate jitter does not affect the oscilloscope trace when using simultaneous sampling of the signal and sawtooth sweep voltages, the frequency stability requirement on the sampling pulse generator 13 in Fig. 1 is not critical, and the sampling rate thereof may be expeditiously controlled with LC tank circuits of familiar design. This allows easily continuous adjustment of the sampling rate to beat with signals of various frequencies. The only requirement on the sampling rate is that its value remains in such range that the low-frequency replica voltages of the signal and sawtooth sweep voltages are within the pass-bands of commercially available cathode ray oscilloscopes.

Simultaneous sampling of the signal and sawtooth sweep voltages as hereinbefore described does not and was not contemplated to suppress all effects of jitter. It is always desirable to have signal jitter appear in the oscilloscope trace because it is a part of the signal information, as hereinbefore mentioned. Complete suppression of the effects of sampling rate jitter is, however, extremely desirable because such jitter is not a part of the signal information and would serve only to introduce error into the oscilloscope display of the signal.

A further application of the simultaneous sampling shown in Fig. 1 would involve the display of Lissajous patterns by two independent high-frequency signals. In such event, trigger pulse generator 11 and horizontal sweep generator 16 would be replaced in the circuit in Fig. 1 with sources X and Z of high-frequency signals, respectively. Thus, sampling gating circuit 12 would sample the signal $f_1$ or Y-signal as previously explained, sampling gating circuit 17 would sample the second high-frequency signal X, and sampling gating circuit 19 would sample the high-frequency signal Z which would then serve to modulate the brightness of the oscilloscope trace. The last-mentioned signal is not necessarily required. This sampling of the Y, X and Z signals would be simultaneously effected and thereby provide low-frequency replica voltages substantially identical in amplitude and phase with the respective high-frequency X, Y and Z signal voltages, as previously explained. Such simultaneous sampling oscilloscope may then be used for the same applications in observing high-frequency repetitive phenomena as the conventional oscilloscope would be used in observing similar low-frequency phenomena.

Thus, the afore-described simultaneous sampling or stroboscopic oscilloscope tends to combine low jitter and wide bandwidth with low cost, increased flexibility of application, and increased deflection sensitivity. It is therefore to be understood that the afore-mentioned arrangements are merely illustrative of the application of the principles of the invention. Numerous other arrangements may occur to those skilled in the art without departing from the spirit and scope of the invention.

What is claimed is:

1. In a circuit for controlling the effects of jitter in a display of a high-frequency signal voltage on a screen of an oscilloscope having vertically and horizontally deflecting plates, a source of said signal voltage tending to include jitter and connected to said vertically deflecting plates, means triggered by said signal voltage for producing a sawtooth voltage and applying said last-mentioned voltage to said horizontally deflecting plates, a normally inoperative first gating circuit connected in circuit between said signal source and vertically deflecting plates, and a generator of sampling voltage of preselected frequency tending to include jitter and rendering said first gating circuit operative at said preselected frequency rate to derive a low-frequency replica signal voltage from the high-frequency signal voltage, said replica signal voltage tending to include in magnified form the jitter present in said high-frequency signal voltage and also tending to include any jitter present in the sampling voltage frequency, said replica signal voltage having an amplitude and phase substantially equivalent to the amplitude and phase of the high-frequency signal voltage, means for controlling the effects of jitter in the display of a waveform trace on said screen as an indication of the high-frequency signaling voltage, comprising a second normally inoperative gating circuit connected in circuit between said sawtooth means and horizontally deflecting plates, said second gating circuit connected to said sampling generator so that the sampling voltage also renders said second gating circuit operative at said preselected sampling frequency rate at the same time said first gating circuit is rendered operative by said last-mentioned voltage to derive a low-frequency replica sawtooth voltage from said high-frequency sawtooth voltage, said replica sawtooth voltage having an amplitude and phase substantially equivalent to the amplitude and phase of the high-frequency sawtooth voltage, said replica signal and sawtooth voltages being simultaneously applied to said vertically and horizontally deflecting plates, respectively, for establishing a waveform trace on said screen as an indication of said high-frequency signal voltage, said last-mentioned waveform trace including the effect of jitter in the high-frequency signal voltage but substantially completely excluding said magnified effect of the signal jitter and the effect of any jitter present in the sampling voltage.

2. The circuit according to claim 1 in which said oscilloscope also includes a brightness electrode and said sawtooth means also produces a high-frequency voltage pulse during each flyback portion of said sawtooth voltage, said last-mentioned means also connected to said electrode, and said jitter controlling means further comprises a third normally inoperative gating circuit connected between said sawtooth means and electrode, said sampling generator also connected to said third gating circuit so that the sampling voltage also renders said third gating circuit operative at the same time that said one and second gating circuits are rendered operative by said last-mentioned voltage for deriving a low-frequency replica voltage pulse from the high-frequency voltage pulse, said last-mentioned replica voltage pulse having an amplitude and phase identical substantially with the amplitude and phase of said high-frequency voltage pulse, said last-mentioned replica voltage pulse supplied to said electrode during the flyback portion of said replica sawtooth voltage to blank said last-mentioned portion.

3. The circuit according to claim 2 which includes a plurality of low-pass filters, of which one is connected in circuit between said first gating circuit and vertically deflecting plates, a second filter connected in circuit between said second gating circuit and horizontally deflecting plates, and a third filter connected in circuit between said third gating circuit and electrode, each of said filters having a cutoff frequency which is less than one-half the numerical value of the preselected frequency of the sampling voltage for passing the low-frequency replica voltages of the respective high-frequency signal, sawtooth and pulse voltages but attenuating the high-frequency components associated with the corresponding replica voltages.

4. The circuit according to claim 3 which includes a plurality of amplifiers, one of which is connected in circuit between said signal filter and vertically deflecting plates, a second amplifier connected in circuit between said sawtooth voltage filter and horizontally deflecting plates, and a third amplifier connected in circuit between said pulse voltage filter and electrode, said amplifiers amplifying the individual low-frequency replica signal, sawtooth and pulse voltages applied to the said vertically deflecting plates, horizontally deflecting plates, and electrode, respectively.

5. In apparatus for suppressing the effects of jitter in a low-frequency display of a high-frequency signal voltage on a screen of an oscilloscope including horizontally and vertically deflecting plates and a brightness electrode, a generator of a sawtooth voltage and a pulse voltage, a source of trigger pulses connected to said generator, a source of said high-frequency signal voltage tending to include jitter and activating said trigger source which supplies trigger pulses to said generator whereby said sawtooth voltage is synchronized with said signal voltage and said pulse voltage is generated during the flyback portion of said sawtooth voltage, circuit means to supply the voltage of said signal source to said vertically deflecting plates, other circuit means to supply the sawtooth and pulse voltages of said generator to said horizontally deflecting plates and electrode respectively, a first normally inoperative gating circuit connected in said first-mentioned circuit means between said signal source and vertically deflecting plates, a producer of sampling voltage having a preselected frequency tending to include jitter and connected to said first gating circuit for rendering said last-mentioned gating circuit operative to derive a low-frequency replica signal voltage from the high-frequency signal voltage, said replica signal voltage tending to include in magnified form the jitter present in the high-frequency signal voltage and also tending to include any jitter present in the sampling voltage frequency, said replica signal voltage having an amplitude and phase substantially identical with the amplitude and phase of the high-frequency signal voltage, means for controlling the effects of jitter in the display of said replica signal voltage on said screen as an indication of the high-frequency signal voltage, comprising second and third normally inoperative gating circuits connected in said other circuit means between said generator and said horizontally deflecting plates and electrode respectively, said second and third gating circuits connected to said sampling generator whose voltage renders said last-mentioned gating circuits operative at the preselected sampling rate to derive low-frequency replica sawtooth and pulse voltages from said high-frequency sawtooth and pulse voltages, respectively, both said last-mentioned replica voltages having amplitudes and phase substantially identical with the amplitudes and phase of the corresponding high-frequency sawtooth and pulse voltages, said replica sawtooth voltage applied by said other circuit means to said horizontally deflecting plates simultaneously with the application of the replica signal voltage to said vertically deflecting plates to establish a waveform trace on said screen as a waveform indication of the high-frequency signal voltage, said last-mentioned indication showing the effect of jitter in the high-frequency signal voltage but substantially completely suppressing said magnified effect of the signal jitter and the effect of any jitter present in the preselected sampling frequency, said replica pulse voltage applied by said other circuit means to said electrode for blanking the flyback portions of said replica sawtooth voltage in said replica signal voltage trace on said screen, and a plurality of low-pass filters, one filter connected in said first-mentioned circuit means between said one gating circuit and vertically deflecting plates, a second filter connected in said other circuit means between said second gating circuit and horizontally deflecting plates, and a third filter connected in said other circuit means between said third gating circuit and said electrode, said filters having a cutoff frequency which is less than one-half said preselected sampling frequency for passing the respective low-frequency replica voltages but attenuating the high-frequency components associated therewith.

6. The apparatus according to claim 5, which includes a plurality of discrete amplifying means, one of said amplifying means connected in said first-mentioned circuit means between said one filter and vertically deflecting plates, the second of said amplifying means connected in said other circuit means between said second filter and horizontally deflecting plates, and the third of said amplifying means also connected in said other circuit means between said third filter and electrode, said amplifying means amplifying the respective replica signal, sawtooth and pulse voltages applied to said vertically deflecting plates, horizontally deflecting plates, and electrode, respectively.

7. In apparatus for displaying Lissajous patterns on a screen of an oscilloscope including a pair of vertically deflecting plates and a pair of horizontally deflecting plates, a first source of high-frequency signal voltage, a second source of high-frequency signal voltage, a pair of normally inoperative gating circuits, first circuit means for connecting a first one of said gating circuits between said first signal source and vertically deflecting plates, second circuit means connecting a second of said gating circuits between said second signal source and horizontally deflecting plates, a generator of sampling voltage pulses having a preselected frequency, said generator connected to said first and second gating circuits, said sampling pulses activating said first and second gating circuits at said preselected sampling frequency at the same time whereby discrete samples of said first and second high-frequency signal voltages from said first and second sources, respectively, are derived to constitute discrete low-frequency replica voltages of said first and second signal voltages, said replica first and second signal voltages having amplitudes and phase substantially identical with the amplitudes and phase of the corresponding first and second high-frequency signal voltages, said replica voltages of said first and second high-frequency signal voltages applied by said first and second circuit means to said pairs of vertically and horizontally deflecting plates, respectively, for establishing Lissajous patterns on said screen.

8. The apparatus according to claim 7 in which said oscilloscope also includes a brightness electrode, and further comprises a third source of high-frequency signal voltage, a third normally inoperative gating circuit, third circuit means for connecting said third gating circuit between said third signal source and electrode, said sampling generator also connected to said third gating circuit, said sampling pulses also activating said third gating circuit simultaneously with the activation of said first and second gating circuits whereby discrete samples of the signal voltage of said third source are derived to constitute a low-frequency replica voltage of the third signal voltage, said replica third signal voltage having an amplitude and phase substantially identical with the amplitude and phase of the third high-frequency signal voltage, said last-mentioned replica third signal voltage applied by said third circuit means to said electrode at the same time that the replica first and second signal voltages are applied to the respective pairs of deflecting plates for modulating the brightness of said Lissajous patterns on said screen.

9. The apparatus according to claim 8 which also comprises a plurality of low-pass filters, and a plurality of amplifiers, each of said filters connected in the output of one of said first, second and third gating circuits by the respective first, second and third circuit means, also each of said filters having a cutoff frequency of less than one-half the numerical value of the predetermined sampling pulse frequency for passing said replica first, second and third signal voltages to said pair of vertically deflecting plates, said pair of horizontally deflecting plates, and said electrode respectively, while attenuating the high-frequency components associated with the corresponding replica voltages, each of said amplifiers connected in the output of one of said filters by the respective first, second and third circuit means for amplifying the replica first, second and third signal voltages applied to said pair of vertically deflecting plates, said pair of horizontally deflecting plates, and said electrode, respectively.

References Cited in the file of this patent

UNITED STATES PATENTS

| | | |
|---|---|---|
| 2,537,104 | Taylor | Jan. 9, 1951 |
| 2,783,436 | Gray | Feb. 26, 1957 |

OTHER REFERENCES

Sugarman: "Sampling Oscilloscope for Statistically Varying Pulses," Review of Scientific Instruments, vol. 28, No. 11, November 1957, pages 933 to 938.